United States Patent [19]

Wonak et al.

[11] Patent Number: 4,839,802

[45] Date of Patent: Jun. 13, 1989

[54] ADAPTATION OF COMPUTER TO COMMUNICATION OPERATION

[75] Inventors: Daniel C. Wonak, Wheeling; Steven J. Butz, Crystal Lake; William A. Miller, II, Palos Hills, all of Ill.

[73] Assignee: Extel Corporation, Northbrook, Ill.

[21] Appl. No.: 932,472

[22] Filed: Nov. 19, 1986

[51] Int. Cl.⁴ .................................... G06F 3/00
[52] U.S. Cl. .......................... 364/200; 364/238.3; 364/228.5; 364/238.5
[58] Field of Search ... 364/200 MS File, 900 MS File

[56] References Cited

U.S. PATENT DOCUMENTS

| | | | |
|---|---|---|---|
| 3,716,835 | 2/1973 | Weinberg et al. | 340/154 |
| 3,771,134 | 11/1973 | Huettner et al. | 364/200 |
| 3,771,135 | 11/1973 | Huettner et al. | 364/200 |
| 3,936,600 | 2/1976 | Galbraith | 364/200 |
| 4,193,131 | 3/1980 | Lennon et al. | 375/2 |
| 4,266,225 | 5/1981 | Burnett et al. | 340/799 |
| 4,377,852 | 3/1983 | Thompson | 364/900 |
| 4,421,950 | 12/1983 | Horyu | 179/2 |
| 4,443,884 | 4/1984 | Swarz | 375/121 |
| 4,484,263 | 11/1984 | Olson et al. | 364/200 |
| 4,495,564 | 1/1985 | Draper et al. | 364/200 |
| 4,525,804 | 6/1985 | Mosier et al. | 364/900 |
| 4,575,793 | 3/1986 | Morel et al. | 364/200 |
| 4,591,967 | 5/1986 | Mattes et al. | 364/132 |
| 4,641,262 | 2/1987 | Bryan et al. | 364/900 |
| 4,665,501 | 5/1987 | Saldin et al. | 364/900 |
| 4,709,329 | 11/1987 | Hecker | 364/200 |

Primary Examiner—Eddie P. Chan
Assistant Examiner—Maria Napiorkowski
Attorney, Agent, or Firm—Kinzer, Plyer, Dorn, McEachran & Jambor

[57] ABSTRACT

A communication adapter for a personal computer or computer terminal is interposed between the computer process unit and its accessory units, such as a keyboard, a printer and a display monitor; the adapter includes a data memory for storing data and actuation signals from the keyboard, from the process unit, and from a communication port on the adapter, together with transmission logic circuits for transmitting data from the memory through the communication port, and accessory logic circuits for supplying data from the memory to the printer and to the monitor. The adapter further includes a microprocessor with a program memory, responsive to signals from the keyboard, that actuates the adapter between a computer mode of operation in which the computer process unit is effectively connected to the accessory units for operation of the computer as if the adapter were not present, and a communication mode in which the adapter and the accessory units function as a telecommunication transceiver independent of the computer process unit. In the computer mode the adapter remains active as an automated telecommunication transceiver, recording incoming data from its communication port in the data memory and transmitting previously recorded data from the memory.

21 Claims, 3 Drawing Sheets

Fig. 4.

ADAPTATION OF COMPUTER TO COMMUNICATION OPERATION

BACKGROUND OF THE INVENTION

Figures 1, 2, 3:
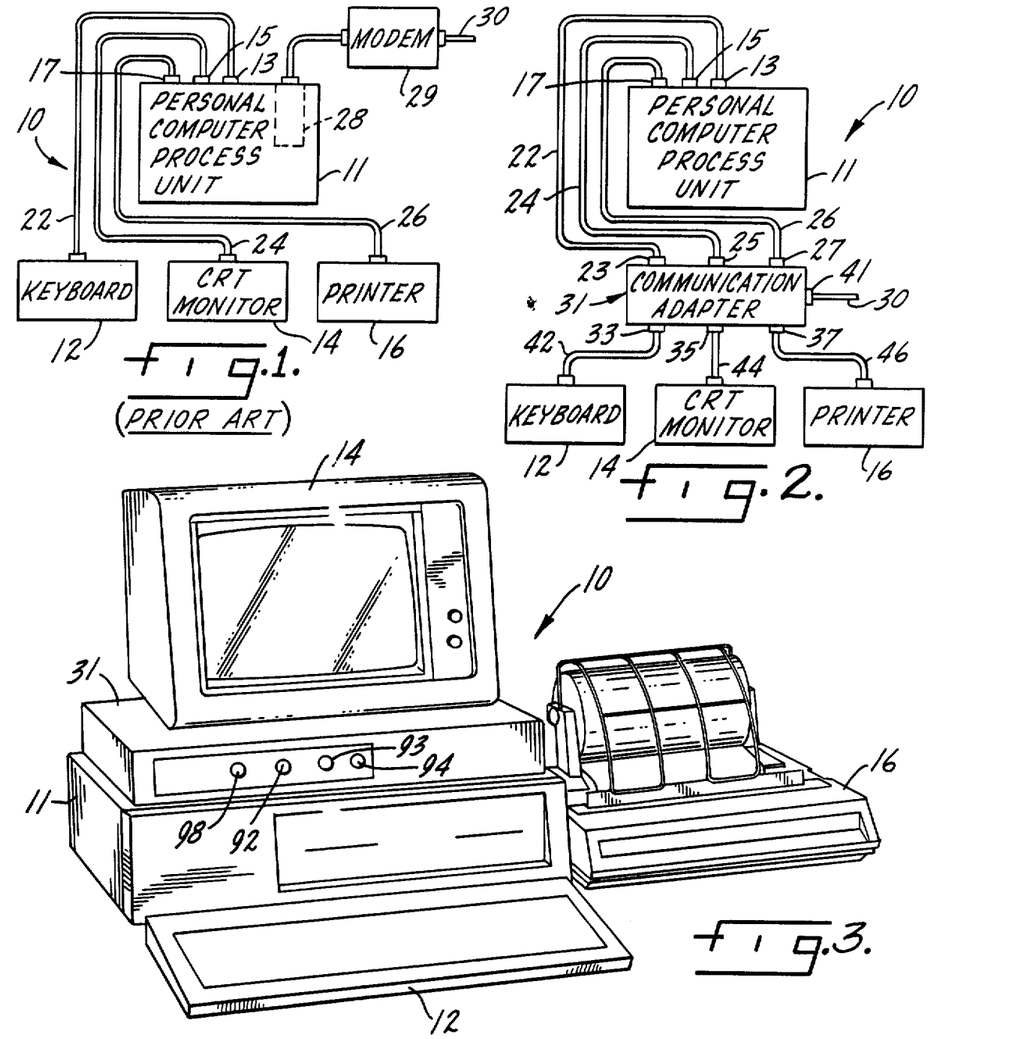
FIG. 1 is a simplified schematic representation of the basic operating units of a personal computer or computer terminal with an adaptation to communication operation as carried out in the prior art.
FIG. 2 is a view, similar to FIG. 1, showing a personal computer or computer terminal connected to a communication line via an adapter constructed in accordance with the present invention.
FIG. 3 is a perspective view of a personal computer equipped with a communication adapter according to the present invention.

Many personal computers employ the configuration illustrated by the personal computer 10 in FIG. 1 of the drawings. A computer of this type includes a computer process unit 11 that is connected to a keyboard unit 12, a cathode ray tube (CRT) monitor unit 14, and a printer unit 16. Process unit 11 has a keyboard port 13, a monitor port 15, and a printer port 17; these ports are connected to keyboard 12, monitor 14, and printer 16 by cables 22, 24 and 26, respectively. Typical personal computers of the kind illustrated by device 10 are the PC, AT and XT computers manufactured by IBM Corporation. Many other manufacturers utilize the same basic configuration. The interconnections between the individual units may be physically different, but the same basic connections are provided.

There has been and is a continuing desire and need by many users and owners to employ their computers as communication terminals. There have also been a number of proposed solutions to the problems presented in the use of a computer for communication purposes. In most instances, conversions of computers for communication operations have connected a serial interface circuit into the bus connectors within the computer process unit. This arrangement is generally illustrated in FIG. 1 by the device 28, shown mounted in the computer process unit 11. Device 28 is usually an RS232 port, which can be connected directly to another computer or may be connected through a modem 29 to a telephone, telex, or other communication network as represented by the communication line 30. In some instances the modem may be combined with the serial port in a circuit mounted in the housing of the computer process unit.

To make either of these configurations work properly, some level of software programming is required for the computer process unit 11. In some instances the software is provided on diskettes and utilized in conventional manner by the computer process unit. In other conversion arrangements, the software is included in the conversion apparatus comprising the serial port and modem added to the computer process unit.

Virtually all of these existing communications adaptations for computers require that the computer process unit housing be opened and that some level of hardware and system modifications be effected inside the computer process unit. This requires a level of system knowledge that the user of the computer frequently does not have and also creates the possibility of appreciable setup problems. Thus, these are not turnkey systems applied to a computer or other computer system by simple plug-in procedures. These previously known solutions may be awkward to carry out, are likely to be poorly adapted to use with different computers, and may be far from "user friendly" as regards changeover between communications operations and normal uses of the computer. Furthermore, performance of the modified computer as a communication terminal may fall short of that available with even a relatively simple "intelligent" telecommunication transceiver.

SUMMARY OF THE INVENTION

It is an object of the present invention, therefore, to provide a new and improved communication adapter for adapting a personal computer or computer system terminal for telecommunication operation that effectively eliminates the difficulties and problems noted above and that requires no modification, in hardware or software, of any of the computer units.

A further object of the invention is to provide a new and improved communication adapter for a computer that has two basic modes of operation, a computer mode in which peripheral units (keyboard, monitor, and printer) function as if they were connected directly to the computer process unit and a communications mode in which the adapter, in combination with the keyboard, monitor, and printer units, functions as a complete intelligent communications terminal. In the computer mode, the adapter remains active as an automated communication transceiver without affecting computer operation.

A specific object of the invention is to provide a new and improved communication adapter for a computer that is relatively simple and inexpensive in construction and capable of providing long, trouble-free operational life.

Accordingly, the invention relates to a communication adapter for a personal computer or a computer terminal for operation as an intelligent telecommunication transceiver without modification of the computer hardware or software, the computer comprising a computer process unit connected to accessory units including a keyboard, a monitor, and a printer unit. The communication adapter comprises computer port means, including a keyboard port, a monitor port, and a printer port, for connecting the adapter to the computer process unit, accessory port means, including a keyboard port, a monitor port, and a printer port, for connecting the adapter to the accessory units, and communication port means for connecting the adapter to a telecommunication circuit. Data storage means are provided for storing data signals and actuation signals received through the accessory keyboard port, the communication port, and one of the computer printer and monitor ports; transmission logic means are included for supplying data signals from the data storage means to the communication port, together with accessory logic means for supplying data signals from the data storage means to the accessory printer and monitor ports. There are program storage means in the adapter for storing operating programs for the communication adapter. Microprocessor control means are operatively interconnected with all of the adapter's port means, both of the logic means, and both of the storage means, for controlling operation of the adapter in two basic modes:

A. a computer mode in which data is interchanged freely between the accessory units and the computer process unit so that the computer units all function as if the adapter were not present, and B. a communication mode in which data is interchanged freely between the accessory units and the communication port so that the adapter and the accessory units function as if the process unit were not present.

The data storage means and the logic means remain active to receive and store signals from the communication port and to transmit pre-recorded signals from the data storage means through the communication port when the adapter is in its computer mode of operation, and the control means is responsive to signals from the keyboard for actuation of the adapter between its computer and communication modes of operation.

DESCRIPTION OF THE PREFERRED EMBODIMENT

The presonal computer 10 illustrated in FIG. 2 incorporates the same basic elements as shown in FIG. 1 and described above, comprising a computer process unit 11, a keyboard 12, a CRT monitor 14, and a printer 16. As before, units 11, 12, 14 and 16 may equally well be considered as representative of the central processing station (unit 11) and one terminal (units 12, 14, 16) of a larger computer system. FIG. 2, however, includes a communication adapter 31 constructed in accordance with the present invention. Adapter 31 incorporates three computer ports comprising a keyboard port 23, a monitor port 25, and a printer port 27. These three ports of adapter 31 are connected to the ports 13, 15, and 17 of the computer process unit 11 by cables 22, 24, and 26 respectively.

Communication adapter 31 also has three accessory ports comprising a keyboard port 33, a monitor port 35, and a printer port 37. These three accessory ports of adapter 31 are individually connected to keyboard 12, monitor 14, and printer 16 by the cables 42, 44, and 46, respectively. Adapter 31 also includes a communication port 41 connected to an external communication line 30. Line 30 may be a part of a telephone, telex, or other switched communication network.

One typical physical arrangement for communication adapter 31 in conjunction with computer 10 is shown in FIG. 3, in which adapter 31 is positioned on top of the housing of computer process unit 11 and monitor 14 is disposed on top of adapter 31. Keyboard 12 is positioned in front of process unit 11 and may be moved around to a limited extent, depending upon the length of cable 42 (FIG. 2). Printer 16 may be positioned as desired adjacent the other units of personal computer 10, again depending upon the length of the cable connection. Of course, other physical arrangements may be utilized as desired; FIG. 3 is merely exemplary.

Set up of communication adapter 31 in conjunction with computer 10 is quite simple. The power supply lines to all of the units 11-14 of computer 10 are first switched off or disconnected. Adapter 31 is positioned as desired in relation to the components of computer 10, particularly accessory units 12, 14 and 16. Cables 22, 24 and 26 are disconnected from keyboard 12, monitor 14, and printer 16 and are reconnected to ports 23, 25 and 27 of adapter 31; cables 42, 44 and 46 are connected from adapter 31 to accessory units 12-14 in the manner shown in FIG. 2. This completes the connections necessary to incorporate adapter 31 into computer 10, and all power connections (not shown) can then be restored; the power connection for adapter 31 should be switched on before power is again supplied to the units of personal computer 10. Connection of a communication line 30 to adapter port 41 can be effected at any time.

Figure 4:
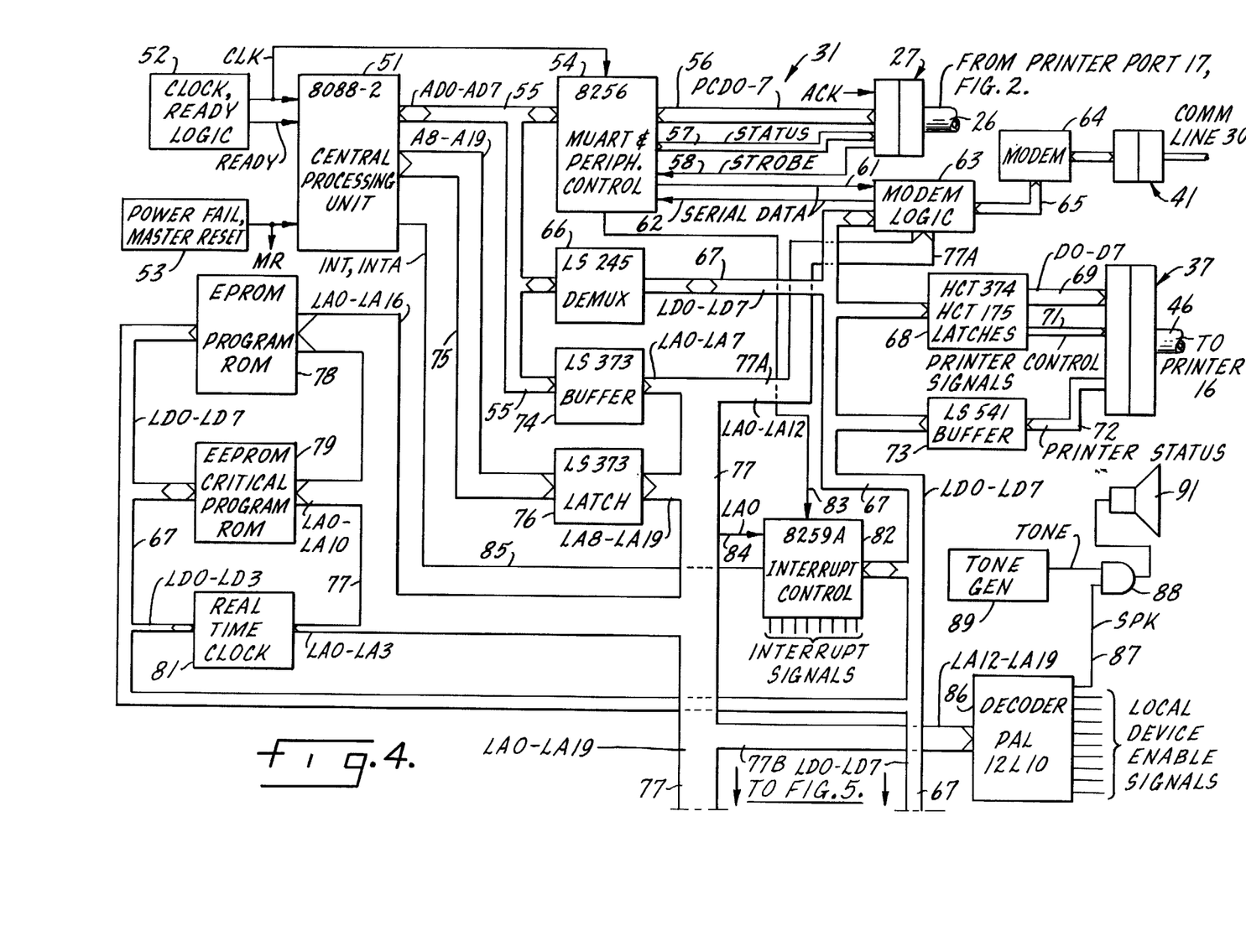
FIGS. 4 and 5 are simplified schematic drawings conjointly illustrate the circuits for data signals and basic command signals in a communication adapter comprising a preferred embodiment of the present invention.
Figure 5:
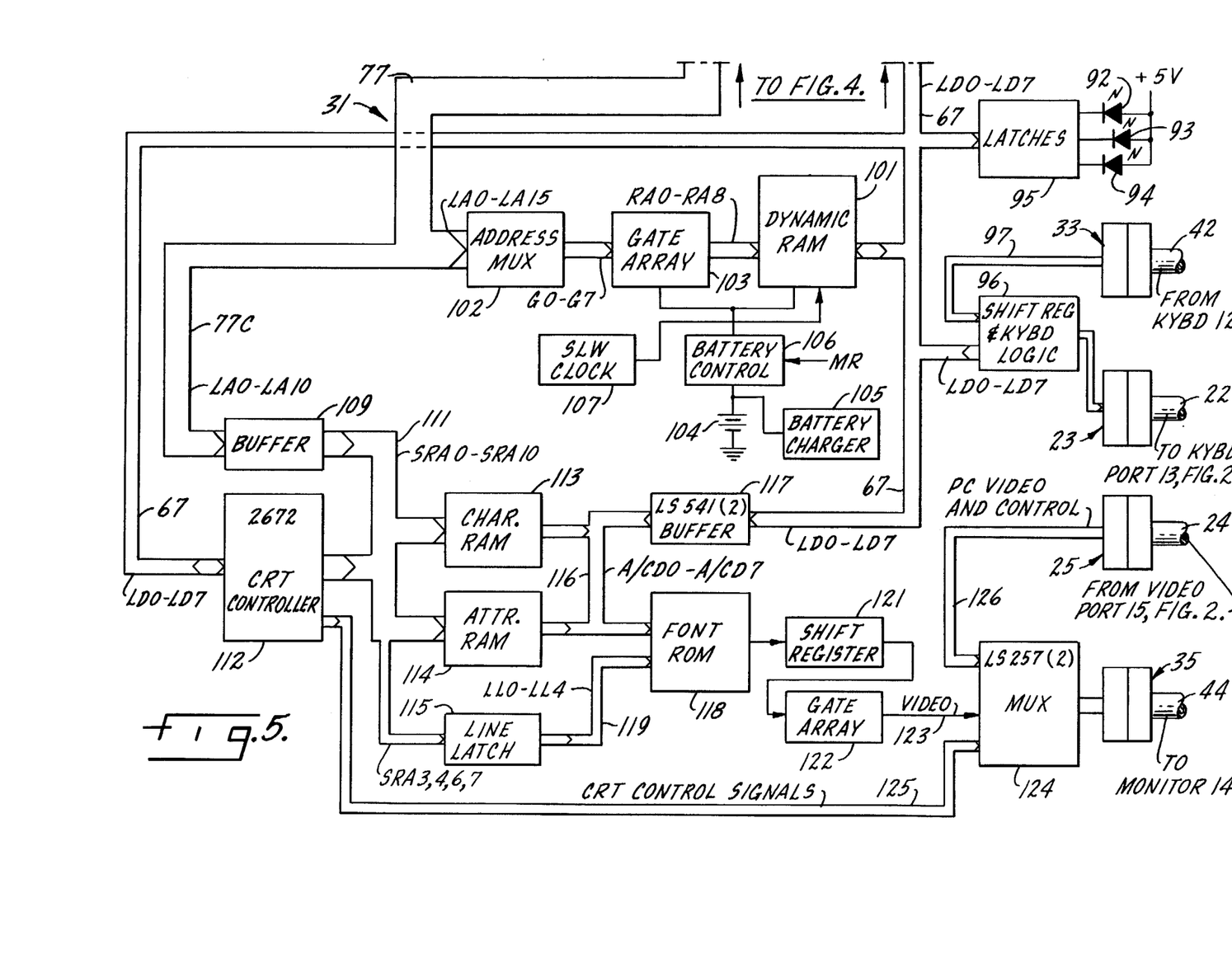

FIGS. 4 and 5 conjointly afford a simplified schematic diagram for a typical operating circuit for communication adapter 31. In both FIG. 4 and FIG. 5 many circuits include identification of preferred commercial integrated circuit types; it should be understood that this information is supplied solely on an exemplary basis and that implementation of the invention is not dependent on use of particular I.C. types. Referring to FIG. 4, it is seen that the circuit includes a central processing unit 51 shown as a type 8088-2 microprocessor. CPU 51 receives clock and ready signals from a circuit 52. CPU 51 also receives a master reset signal MR from a power failure and master reset circuit 53.

The clock signal from circuit 52 is also supplied to a MUART and peripheral control integrated circuit, shown as type 8256. The MUART 54 is connected to CPU 51 by an eight conductor address and data bus 55. MUART 54 is also connected to computer printer port 27 of adapter 31 by an eight conductor personal computer data bus 56. Other connections between port 27 and MUART 54 include a status bus 57 and a strobe circuit 58. Port 27 of adapter 31 is connected to the printer port 17 of the personal computer process unit 11 by cable 26; see FIG. 2.

As shown in FIG. 4, two serial data circuit connections 61 and 62 interconnect MUART 54 with a modem logic circuit 63. The modem logic circuit 63 may include a read-only memory (ROM), typically having a capacity of 8K, in which an operating program for a modem 64 is recorded, logic circuit 63 being connected to modem 64 by a bus 65. Modem 64 is connected to the communication port 41 for adapter 31, port 41 in turn being connected to communication line 30. The circuits for logic 63 and modem 64 have not been shown in detail because these may be essentially similar to corresponding circuits used in commercial telecommunication terminals.

The address and data bus 55 that interconnects circuits 51 and 54 is also connected to a demultiplexer circuit 66. Demux 66 is turn connected to an eight conductor local data bus 67 that extends to and is connected to the modem logic circuit 63. The local data bus 67 is also connected to a set of latch circuits 68, these latches being connected to the accessory port 37 of adapter 31 by an eight conductor data bus 69. Connection of port 37 to printer 16 is effected by cable 46. There is also a printer control signal bus 71 connecting latches 68 to port 37. A printer status bus 72 affords an input connection to adapter 31, from its accessory printer port 37 to a buffer circuit 73. Buffer circuit 73 has output connections to the local data bus 67.

The address data bus 55 is connected as an input to a buffer circuit 74 in the center of FIG. 4. A twelve conductor address bus 75 carrying output signals from the control microprocessor 51 affords an input to the latches in a latch circuit unit 76. The outputs from buffer circuit 74 and latch circut 76 are combined in a local address bus 77. Thirteen of the conductors of the local address bus 77 are connected, as a bus 77A, affording input to the modem logic circuit 63. Bus 77 also provides inputs to a first program read-only memory 78, a second program ROM 79, and a real time clock circuit 81. The first program ROM 78 may comprise an erasable programmable read-only memory (EPROM) having a storage capacity of 192K. The second program ROM 79 may comprise an electrically erasable PROM (EEPROM) having a storage capacity of 16K. The two program ROMS 78 and 79 and the real time clock circuit 81 are all connected to the local data bus 67 of adapter 31.

The circuit for adapter 31, FIG. 4, further comprises an interrupt control circuit 82, shown as type 8259A. This interrupt control circuit 82 has input and output connections with local data bus 67. Another input to interrupt control 82 is derived from MUART 54 via a circuit connection 83. Yet another input to interrupt control circuit 82 is derived from one of the conductors in local address bus 77 by means of a connection 84. An interrupt connection from control circuit 82 to the main microprocessor control, CPU 51, is shown as a circuit 85. It will be understood that there are a number of interrupt signal outputs from control circuit 82 to various other circuits in adapter 31 the interrupt signal connections have for the most part been omitted from FIGS. 4 and 5 to avoid undue complexity in those figures and because the requirements for and the uses of the interrupt signals are well known in the art.

The circuit arrangement of FIG. 4 further comprises a programmable array logic (PAL) circuit 86, which may be type 12L10. Data is supplied to PAL circuit 86, which functions as a decoder, through an input bus 77B that includes eight of the conductors from local address bus 77. The PAL decoder circuit 86 generates a plurality of local device enable signals that are applied to various circuits in FIGS. 4 and 5. Again, the circuit connections for these local device enable signals are not shown in the drawings because their requirements and functions are well known in the art and because these circuit connections would unduly complicate the drawings. One output circuit 87 from the PAL decoder 86 is shown, leading to an AND gate 88. A second input to gate 88 is provided from a tone generator 89. The output from gate 88 is supplied to a small speaker or annunciator 91.

Local data bus 67 and local address bus 77 both extend to FIG. 5. In the circuit of FIG. 5, bus 67 affords a local data input to a plurality of latches 95. These latch circuits are employed for selective energization of three light-emitting diodes 92, 93 and 94. Diode 92 is energized to indicate that a message has been received on communication line 30. Diode 93 is energized to indicate that communication line 30 is in active use. Diode 94 is energized to indicate that a transfer of data between adapter 31 and computer process unit 11 is taking place. Indicators 92-94 are preferably mounted on the front of adapter 31, as shown in FIG. 3, along with a power-on indicator, the LED 98.

Local data bus 67 is supplied with input signals from a shift register and keyboard logic circuit 96. Circuit 96 receives data signals from keyboard 12 through cable 42, the keyboard accessory port 33 of adapter 31, and a bus 97. Output signals from keyboard logic circuit 96 are supplied to the keyboard port 13 of computer process unit 11 (FIG. 2) through a connector 23, representing the computer keyboard port of adapter 31, and cable 22.

The principal data memory for adapter 31 is represented in FIG. 5 by a dynamic random access memory (DRAM) unit 101 which, in the illustrated embodiment, has a total storage capacity of 256K, with 200K generally available for data storage. The dynamic RAM 101 has an input-output interconnection with local data bus 67. A further data input to DRAM 101 is derived from local address bus 77 through an address multiplex circuit 102 in series with a set of eight gates in a gate array 103. Gate array 103 and dynamic RAM 101 are maintained in operation for extended periods in the event of power failure by a battery 104, an associated battery charger circuit 105, and a battery control circuit 106. The battery control circuit is actuated by master reset signal MR from circuit 53 in FIG. 4. A separate SLW clock circuit 107 is provided for DRAM memory 101.

The lower portion of FIG. 5 presents the control circuits for CRT monitor 14 (see FIGS. 2 and 3). One input to this portion of the circuit is derived from an extended portion 77C of local address bus 77, connected to a buffer circuit 109 having its output connected to a static RAM address bus 111. Another principal system connection to the control circuits for the CRT monitor is derived from the local data bus 67, which has an input-output connection to a conventional cathode ray tube controller circuit 112, typically a type 2672 integrated circuit. Controller 112 has an output connection to bus 111. That bus affords inputs to two static RAM circuits, a character memory 113 and a character attribute memory 114. A portion of bus 111 is also connected as an input to a line latch circuit 115. RAMs 113 and 114 may be of types conventionally used in telecommunication terminals.

The outputs of the two character and character attribute RAMs 113 and 114 are connected to an attribute character data bus 116. Additional input to bus 116 is derived from local data bus 67 through a buffer circuit 117. Bus 116 affords the data input to a type font read-only memory 118. The font ROM 118, which may be of a type used in commercial telecommunication terminals, also receives control signals from the line latch circuit 115 over a line latch bus 119.

An output signal from font ROM 118 is supplied to a shift register 121 that is in turn connected to a gate array 122, producing an output video signal on line 123 that is supplied to a multiplexer circuit 124. Additional cathode ray tube control signals (e.g. horizontal drive, vertical drive, blanking and high light signals) are supplied to the multiplex circuit unit 124 from CRT controller 112 by means of a bus 125. Another input bus 126 to multiplexer circuit 124 supplies video and CRT control signals derived from the personal computer video port 15 through cable 24 and port 25 of adapter 31. The requisite data and control signals for operation of CRT monitor 14 are supplied from multiplexer unit 124 through accessory port 35 of adapter 31 and the connecting cable 44.

Figure 6:
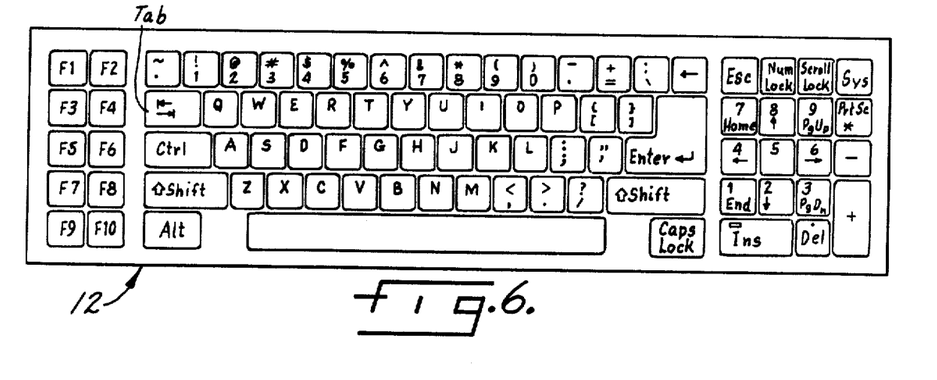
FIG. 6 is a plan view of a keyboard for the personal computer of FIG. 3.

The foregoing description, particularly that for FIGS. 4 and 5, encompasses the principal data and control circuits utilized in the preferred embodiment of communication adapter 31. FIG. 6, illustrating a typical computer keyboard is presented to assist in the operational description set forth hereinafter. The keyboard arrangement is likely to vary from one computer to another, but the basic keys utilized for actuation and control of communication adapter 31 and the computer itself will be present in virtually any personal computer or computer terminal.

In considering operation of communication adapter 31 it may be assumed that installation of the adapter in computer 10 has been completed and that power is on for accessory units 11, 12, 14 and 16 as well as adapter 31. Further, it is assumed that adapter 31 has been actuated, through keyboard 12, for operation in its basic communication mode. This would ordinarily be the mode of operation established on startup. If adapter 31 has previously been operating in its computer mode, transfer to the communication mode is effected merely by touching a predetermined sequence of keys. In adapter 31 the mode-change key sequence is keys ALT and PRTSC (FIG. 6), in that order; a number of other key sequences may be used.

At the outset, with adapter 31 in its communication mode, the adapter is in an idle state displaying a directory menu:

TABLE I—Directory Menu

1. Local Messages
2. Transmit Queue
3. Transmitted Messages
4. Received Messages
5. Auto Sequences
6. Terminal Configuration In this state, entering the number of a selected directory through one of the numerical keys across the top of keyboard 12 causes that directory to be displayed by monitor 14.

One frequently used directory is the "terminal configuration" or options menu selected by touching key 6 when adapter 31 is in its idle state:

Table II—Options Menu

1. General Options
2. Communication Options
3. Memory Options
4. Printer Options
5. Computer Options
6. Clear Memory
7. Enter/Change Password
8. Disable Memory Save The first four items in the Options Menu, Table II, are configuration options for adapter 31. Item five is for characterization of computer 10. The remaining items in the Options menu, of Table II, are operational utilities which the operator may be required to perform from time to time. Options 2, 3, 5 and 7 may be protected by a password to inhibit unauthorized modifications.

The directories constituting the first four items in the Directory Menu, Table I, are each a chronological listing of messages or files stored in DRAM 101 (FIG. 5). Item 5, the Auto Sequence directory, is recorded in EEPROM 79 (FIG. 4). The last message or file recorded in each directory is shown at the top of the listing with the cursor positioned on the command line whenever a directory is selected. For each of the first four directories, monitor 14 displays the first line of characters from each message, up to a total of sixty characters, to indicate the content of that message. The fifth directory in Table I, Auto Sequences, displays the first characters, up to a total of thirty-one characters, from the first line of each sequence.

A new file or message may be created, starting from the idle state in the communication mode, by touching the keyboard function key F9 (FIG. 6) followed by the ENTER key. (The ENTER key is characterized by different legends in the computer keyboards of different manufacturers; it may sometimes be referred to as a new line key, a return key, or other designation.) The display screen of monitor 14 goes blank, showing a cursor positioned in the upper left corner of the screen and a tab ruler line displayed in reverse video across the bottom of the screen. At this juncture, a new message or file may be entered into the data storage means, dynamic RAM 101 (FIG. 5) by normal operation of keyboard 12 (FIG. 6). To save the message and return to the idle state, the operator may touch either of the F9 or F10 function keys.

A new file or message may also be recorded in adapter 31, starting from the local messages directory, again by sequentially actuating the keys F9 and ENTER. As before, the message is entered into storage by normal operation of keyboard 12. To save the file and return to the idle state, key F10 may be actuated. To save the message and return to the local messages directory, key F9 may be actuated.

Adapter 31 provides for editing of files in the idle, local messages, and auto sequence directories. To edit any file, the operator selects the appropriate directory from the Directory Menu and then touches function key F9. When this is done the reverse video line at the bottom of the display screen of monitor 14 reads:

"Edit File______"

Entry of the number of the file to be edited, using the numerical keys across the top of keyboard 12, followed by actuation of the ENTER key, causes the file to be displayed on the monitor screen. Any editing function may be performed at this time. When the file is first displayed, the cursor of monitor 14 will be located at the beginning of the file or message test. Using the cursor control keys 1-9 at the right-hand side of keyboard 12, FIG. 6, in the usual manner allows for repositioning of the cursor to any desired location. Actuation of the END key causes the monitor to display the last ten lines of the message with the cursor located on the last character.

As previously noted, key F9 is used to access the editing functions of adapter 31 when in its communication mode. If key F9 is touched while in the idle state, accessing the editing functions, subsequent actuation of the same key returns adapter 31 to its idle state. If key F9 is touched while in one of the file directories, and then actuated again (e.g., after editing functions have been effected), adapter 31 returns to the selected file directory.

Actuation of keys ALT and F9 in that sequence is utilized for insertion of a pre-recorded auto character sequence (not a call or dial sequence) into the text of a file or message. Sequential actuation of keys ALT and F2 actuates adapter 31 to perform a justification function, adjusting each line of a paragraph to contain the maximum number of complete words based on the right-hand margin setting. Keys ALT and F3, when actuated in sequence, cause adapter 31 to copy a file or message from the position of the cursor to the end of the message. The copy is stored in the local messages directory and is automatically assigned a new file number. Keys ALT and F4, when actuated in sequence, cause adapter 31 to insert a blank line at the position of the cursor of monitor 14. If the cursor is at the beginning of a line, the blank line is inserted above the current line.

In editing of messages, the DEL key (FIG. 6) is used to delete an individual character at the position of the cursor on the display screen of monitor 14. Characters to the right of the cursor are shifted left one space. To delete a complete line from a message, keys ALT and F5 are actuated in sequence. This deletes an entire line of text, from the position of the cursor to the end of the line. If the cursor is at the beginning of an empty line, the text below that line is moved up. Actuation of key F5 alone deletes any portion of a message from the position of the cursor to the end of the file.

A search/replace editing routine can be effected by sequential operation of the ALT and F7 keys. In this operation the operating circuits of adapter 31 search for a given expression and replace it with a different expression. For a search operation without replacement, keys ALT and F8 are actuated in sequence. The INS key, when actuated, initiates an insert sub-mode in which characters may be added into a line of text without overriding existing characters. The insert sub-mode remains in effect until key INS is actuated a second time.

A number of functions in adapter 31 are performed by two-key sequences that start with the ALT key followed by actuation of one of the numerical keys across the top of keyboard 12, FIG. 6. In one of these sequences, key 1 is used to set beginning and ending marks in the text of a file or message. Key 2, actuated immediately after the ALT key, causes adapter 31 to save a marked text as a new local message or file. Keys ALT and 3 copy a marked text into a new location within the current directory. The sequence ALT and key 4 is used to move a marked test to a new location in a directory. ALT plus key 5 deletes a marked text from storage in DRAM 101. Merging of a specified file into the current directory at the cursor position is accomplished by the key sequence ALT and key 6. Centering of a line in which the cursor is located is effected by the sequence ALT and key 7.

All of the files in the local messages, transmit queue, transmitted messages and received messages directories are automatically assigned a file number when recorded in adapter 31. With the exception of the transmit queue, all types of messages share the same numbering sequence. Each time a file or message is created, it is assigned the next file number in the sequence. When the maximum number of files is reached the number sequence starts over at the next lowest available number. The maximum number of files varies, depending upon the length of individual messages, with an overall maximum of 450 messages. Messages recorded in the transmit queue are assigned separate numbers, which are always in sequence. If a given number is deleted in the transmit queue, the remaining higher numbers decrement to fill the void. To edit a file recorded in the transmitted messages or received messages directories, the file or message must first be copied into the local messages directory, using the key sequence ALT plus F3.

Adapter 31 utilizes tone generator 89 and annunciator 91 (FIG. 4) as an alarm to warn the operator of error conditions. For most such conditions, the alarm is sounded once for each occurrence. However, some conditions cause a repetitious and continuous "beeping" of the alarm. These are all associated with printer 16 and indicate that the printer has not been appropriately selected, that the paper supply to the printer is below a minimal level, or that some other condition is creating a printer error. To shut off the multiple alarm sound, the operator holds down the shift key on keyboard 12 (FIG. 6) and actuates the ENTER key.

In adapter 31, the principal communications functions are carried out by the function keys F1-F10 at the left-hand side of keyboard 12, FIG. 6, individually and in combination with the keys CTRL and ALT. Before considering individual communication operations, a brief review of the functions for keys F1-F10, alone or in combination with the CTRL and ALT keys, may be useful.

The F1 key functions as a "help" key; when actuated individually it causes monitor 14 to display a listing of functions for adapter 31 and appropriate keys to be used for each function. The key sequence ALT plus F1 may be utilized for display of additional key functions.

Function key F2, used alone, selects the communication line 30 (FIGS. 2 and 4); it is used to initiate a call. The key sequence CTRL plus F2 is utilized to disconnect a conversational call. Key F3, when used alone, provides visual monitoring of the communication line 30 during either transmission or reception of messages. The key sequence CTRL plus F3 is utilized to transmit an answerback signal over line 30 to identify the communication terminal afforded by computer 10 and adapter 31.

By itself, key F4 redials the last dial number called. The key sequence CTRL plus F4 transmits an inquiry signal on line 30, asking for an answerback from a remote terminal. The key sequence CTRL plus F5 transmits a "break" signal to interrupt transmission at a distant terminal. The sequences CTRL plus F6 and CTRL plus F7, when connected, effect the transmission of Baudot codes for figures and for letters, respectively.

Placing a call on communications line 30 may be initiated by entering a number to be called into memory 101 in adapter 31, using the keyboard 12, and then sending a text; the text may be a message previously recorded in DRAM 101 or one generated by use of the keyboard. Alternatively, an "auto sequence" may be utilized to dial a number automatically and send a message from memory 101 either at the present time or at a selected future time.

Starting from the idle state, in which the Directory Menu of Table I is displayed, there are five steps in placing a communications call. The call key F2 is first actuated. This selects the communications line 30 and causes monitor 14 to display:

Table III—Directory Selection

1. Local Messages
2. Transmit Queue
3. Transmitted Messages
4. Received Messages
5. No Message to Send If the call is to be a conversational call, item 5 is selected from this menu. Otherwise, the desired directory is selected from items 1–4. This will not be necessary if placement of the call starts with adapter 31 already in a message directory.

For a conversational call, with "No Message to Send" having been selected from the menu of Table III, the next step is to enter the number to be dialed, using the keyboard, after which the ENTER key is actuated. Alternatively, the identity of an auto sequence may be entered. Once the call connection has been completed, information may be transmitted readily from the keyboard. For a conversational call, it is also possible to select a previously recorded message for transmission as a part of the call. This is accomplished by entering the file identification number and actuating the ENTER key after selection of the directory in which the message is recorded. In this modified sequence, a call type selection menu appears on monitor 14 as follows:

TABLE IV—Call Type Selections

1. Conversational
2. Background Now
3. Background Timed

Because this is a conversational call, the first item is selected from this menu. When the call connection is complete, information may be transmitted through the use of the keyboard as before. To send the preselected file, the key sequence CTRL plus F1 is actuated. To send additional files, the required key sequence is F10 plus 1 plus F9 plus message number plus ENTER plus F3 plus CTRL plus F1. Editing is permitted after the ENTER key is actuated. Upon completion of the full sequence, the additional file is transmitted automatically from storage in DRAM 101.

During any conversational call, touching the key sequence CTRL plus F1 stops transmission. Touching the same sequence again causes transmission to resume. The transmission of one pre-recorded film from memory must be completed before another file can be transmitted. Disconnection of the conversational call is effected by the key sequence CTRL plus F2.

For automatic dialing of a call, using adapter 31, the operation is again initiated by actuation of key F2. From the resulting display menu, Table III, one of the message directories is selected. The file number for the message to be transmitted is entered through keyboard 12, followed by actuation of the ENTER key. Next, the keyboard is utilized to enter an auto sequence identification number, again followed by ENTER. At this point, the monitor displays the Call Type Selections menu, Table IV. If "Background Now" is selected, the selected message is transmitted automatically and adapter 31 returns to the idle state. If the "Background Timed" alternative is selected, the time and date for transmission are recorded through the keyboard, again followed by actuation of the ENTER key. The adapter 31 then returns to its idle condition; the message is recorded in the transmit queue (see Tables I and III) and will be transmitted at the selected time.

Up to thirty messages may be recorded in the Transmit Queue directory at any given time. If more than thirty entries are attempted, alarm 91 is actuated (see FIG. 4) and "Too Many Entries" is displayed on monitor 14. In automatic calling (Table IV items 2 and 3) up to five messages may be linked. Each group of linked messages, when entered in the Transmit Queue, counts only as a single queue entry.

Traffic on communication line 30 may be monitored at any time by actuation of function key F3. This will display the line traffic on CRT monitor 14. When monitoring line traffic curing a transmission from the Transmit Queue, keyboard 12 is not interactive and cannot be used for conversation to the line. When monitoring received line traffic, the call becomes a conversational call, allowing keyboard 12 to be interactive and permitting conversation on the line.

Transferring recorded messages or files from personal computer process unit 11 to adapter 31 and vice versa may be initiated by actuation of function key F7. When this is done the menu displayed on monitor 14 is:

Table V—Transfer File

1. Computer to Adapter
2. Adapter to Computer—Manual
3. Adapter to Computer—Automatic Transferring files from computer process unit 11 to adapter 31 is carried out using the print function of the computer. During the operation, monitor 14 displays the legend "File Transfer in Progress". Actuation of function key F10 is effective to abort the transfer. While a file transfer proceeds, LED 94 (FIGS. 3 and 5) is illuminated.

One technique for transfer of recorded data from computer process unit 11 into adapter 31 starts with the adapter in its communication mode, attained by actuation of keys ALT and PRTSC in sequence if previously in the computer mode. Key F7 is then actuated, followed by selection of the first item, Computer to Adapter, from the Transfer File menu, Table V. At this juncture, there is an automatic changeover to a modified computer mode of operation for adapter 31, with keyboard 12 utilized to actuate process unit 11 to output data through its port 17 in the same manner as if the data from the process unit were to be printed out by printer 16. What actually happens is that the selected data previously recorded in process unit 11 is re-recorded in the local files directory of adapter 31. When transfer is complete, the key sequence ALT plus PRTSC may be utilized to return to the communications mode of operation. There is no erasure of the transferred message in process unit 11 unless effected through normal commands, entered via keyboard 12, while still in the modified computer mode.

Another method of transfer of file data from process unit 11 to adapter 31 entails preliminary recording of program option symbols at the beginning and end of the text to be transferred, as follows:

Table VI

1. PCSOH=(P.C. —start of header)
2. MEM=(Save in memory)
3. PCSTX=(P.C. —start of text) Text of file for transfer
4. PCEOT=(P.C. —end of text) ps When the print function of computer 10 is subsequently performed, the file is recorded in memory 101 in adapter 31 instead of being printed by printer 16.

A third method, in which a file transferred from the computer process unit 11 to adapter 31 is not only recorded in the adapter memory but is also placed in the transmit queue for transmission to communication line 30, entails the following commands recorded at the beginning and end of the text as stored in computer unit 11:

Table VII

1. PCSOH
2. COM=(File is to be transmitted)
3. ASEQ=(Auto sequence identification)
4. DIAL=(Dial number, if required)
5. NTWK=(Network number, if required)
6. EABK=(Expected answerback, if required)
7. TIME=(If omitted, time is now)
8. Date=(If omitted, data is today)
9. PCSTX Text of file for transfer
10. PCEOT For manual transfer for message data from adapter 31 to the computer process unit 11, starting in the computer mode for the adapter, a new file is opened to receive the transferred message, using the usual procedure appropriate to the computer. This would include entry of the usual data for identifying the new file as recorded in the computer process unit. A changeover to communications mode is effected by sequential actuation of the keys ALT and PRTSC. Function key F7 is then actuated (whether in an idle state or in a directory) and option 2 is selected from the menu of Table V. At this stage, the number of the file in adapter 31 to be transferred to computer unit 11 is entered through keyboard 12, followed by actuation of the ENTER key. In this manner, any message recorded in adapter 31 can be readily transferred to computer process unit 11.

For an automated transfer of messages from adapter 31 to computer process unit 11, the operation may be initiated from the idle state or from a directory with adapter 31 in its communications mode. First, the operator actuates key F7 so that the transfer file menu, Table V, is displayed on monitor 14. Item 3 from that menu (Adapter to Computer - Automatic) is selected and entered. At this point, if operation was started from the idle state, the directory menu of Table III is displayed and a directory must be selected, from which the transferred message is to be taken. This does not occur if operation has started from one of the directories.

With the directory selected, the operator enters the number of the file to be transferred automatically to the computer process unit 11, followed by actuation of the ENTER key. This calls up the auto sequence directory to the monitor. An auto sequence identification designation for automated transfer to process unit 11 is entered through keyboard 12 and the ENTER key is again actuated. At this stage, monitor 14 will present a prompt, asking for entry of the file identification for the message as it is to be recorded in computer process unit 11. This is entered via keyboard 12, followed by further actuation of the ENTER key. From this point on, the selected file is automatically transferred from adapter 31 to computer process unit 11.

Autocall sequence codes are employed, in adapter 31, in essentially the same manner as in telex, DDD, and other more conventional communication terminals. To distinguish auto sequences, for communication-mode operation of adapter 31, a characterizing key symbol is selected that is not required for or used in normal communication. In adapter 31, the key symbol selected is the tilde key, the leftmost key in the top row of the central portion of the keyboard. The auto sequence characters, each effective only when preceded by a tilde, are:

TABLE VIII

| | Auto Sequence Symbols | |
|---|---|---|
| 1. | L ___ | Expected answerback |
| 2. | I ___ | Call retry interval (0 to 255 min.) |
| 3. | J ___ | Number of call retries (0 to 255) |
| 4. | S ___ | Baud rate for transmission |
| 5. | Y ___ | Parity |
| 6. | F | Full duplex operation |
| 7. | H | Half duplex operation |
| 8. | Z | Enable/disable |
| 9. | G | Echoplex operation |
| 10. | 1 | Select first communication port |
| 11. | D | Wait for dial tone |
| 12. | T ___ | Tone dialing (maximum of 35 characters, including delays) |
| 13. | P ___ | Pulse dialing (same as T) |
| 14. | N ___ | Network number |
| 15. | M | Begin transmission |
| 16. | C ___ | Change wait time for received data (0 to 65,536 seconds) |
| 17. | R ___ | Match and receive |
| 18. | E ___ | Answerback match requirements |
| 19. | EO through EA | Variations of E |
| 20. | V | Call successful |
| 21. | X ___ | Transmit data |
| 22. | B | Disconnect |
| 23. | K | Transmit time and date |
| 24. | A | Transmit answerback |
| 25. | W ___ | Wait before next autocall (0 to 65,536 seconds) |
| 26. | 4 ___ | Display text for prompt |
| 27. | 0 | Adapter to P.C. transfer |
| 28. | 3 | Start transfer loop |
| 29. | 3A | End transfer loop |
| 30. | 3M | Insert adapter file number |
| 31. | 3Q | Query end of loop |
| 32. | 5 | Same as 4 except in loop, then only one prompt. |

In Table VIII, the first ten auto sequence symbols are set-up commands that must be placed prior to a call request. The next seven symbols, numbers 11 through 17, are call process commands that must be entered in the proper order of execution. An underline indication following a symbol in Table VIII indicates that the operator is to enter data through keyboard 12. Generally speaking, data transfer from adapter 31 to computer process unit 11 is governed by the M, W, X, 0, 3, 3A, 3M, 3Q, 4 and 5 symbols (each, of course, preceded by a tilde for auto sequence use), the others being used for communications purposes.

In adapter 31, when in the communication mode of operation, data entered through keybaord 12 is supplied to the local data bus 67 through the shift register and logic circuit 96, FIG. 5. That data from the keyboard may modify the operational state of adapter 31, since it is supplied to the CPU 51 through circuit 66 and bus 55 (FIG. 4). The keyboard-originated data may be recorded in the main data memory, DRAM 101, as a part of one of the directories 1-3 of Table I, or may be recorded in EEPROM 79 as an auto sequence. Data signals from the keyboard may also be supplied, via bus 67, through latches 68 and port 37 to printer 16 (see FIG. 4), or through circuit 117, bus 116, ROM 118 and circuits 121-124 and port 35 to monitor 14 (FIG. 5). Of course, bus 67 also supplies the same data, through logic circuit 63 and modem 64, to port 41 and communication line 30 (FIG. 4). Thus, text data entered through keyboard 12 may be monitored on display 14, printed by printer 16, and transmitted through any network to which line 30 is connected, all without requiring any change in the physical arrangement of any component of computer 10 or even in the software of its computer process unit 11.

When in its computer mode of operation, adapter 31 is seemingly "transparent" as regards normal signal transmission between units 11, 12, 14 and 16 of computer 10. Command and data signals from keyboard 12 go from port 33 into storage, for a very brief interval, in the shift register/keyboard logic circuit 96. During that very brief storage interval, each keyboard signal is supplied to and checked by the adapter control, microprocessor 51. Command signals concerned with control of computer operations and ordinary data signals are immediately sent on to computer process unit 11 via port 23, cable 22 and port 13 (FIGS. 2 and 4); this also applies to ordinary data signals. Any signal or signal combination from keyboard 12 that affects the mode of operation of adapter 31, however, is identified by CPU 51. Thus, when the sequence ALT plus PRTSC in buffer 96 is identified while adapter 31 is in the computer mode, the adapter is promptly switched to the communications mode by microprocessor 51, based on its control program. Thus, the buffering function of circuit 96 facilitates the effective control of adapter 31 through keyboard signals, with no added control switches or like elements.

When operating in its computer mode, as previously noted, adapter 31 seems "transparent" to the operator. Actually, it is not. Adapter 31 continuously serves as a buffer or "print spooler" for printer 16, even when the adapter is in the computer mode. Thus, in the computer mode data and control signals to actuate printer 16 are always recorded in data store 101 and read out to the printer via bus 67, latches 68, buses 69,71, port 37 and cable 46. Thus, even though not detectable by the operator, the printer actuation signals are always processed through adapter 31. Thus, regardless of whether adapter 31 is in its computer mode or its communication mode, operation of printer 16 is essentially unchanghed; it is a shared resource available to both adapter 31 and computer 10 through the "printer spooler" action of the adapter.

The principal operating program for adapter 31 is stored in the program memory, EPROM 78 (FIG. 4). That program determines whether and how all data signals are recorded, printed, or displayed. It controls changeovers between the basic computer and communications modes of operation for adapter 31, and variations occurring within those modes such as the previously described file transfer variations of the computer mode. Acting in conjunction with CPU 51, MUART 54, and the numerous other control circuits, EPROM 78 determines the major functional attributes of adapter 31.

The other program memory, EEPROM 79, stores programming that is more likely to be revised. Thus, the auto sequences are stored in memory 79, together with set-up information for the communication terminal (e.g., the answerback). EEPROM 79 also stores information for the various options for adapter 31; see Table II.

When the combination of computer 10 and adapter 31 is turned "on", an initial legend is presented on monitor 14; that legend includes instructions to the operator to actuate the ENTER key. When that is done, adapter 31 goes into the idle state, in its communication mode (Table I). To change to the computer mode so that computer 10 can function as originally intended, with no interaction with adapter 31, the operator merely actuates the key sequence ALT plus PRTSC. Subsequent touching of the same key sequence will return adapter 31 to the communications mode. As previously noted, a different key sequence may be used.

While in its computer mode, adapter 31 still performs basic communications functions. The adapter acts automatically to receive and record calls from distant terminals, via line 30. Activity on line 30 is indicated to the operator by LED 93 (FIGS. 3 and 5); the recording of a received message is shown by LED 92. Neither indicator requires immediate attention by the operator but they do show the possible necessity for future activity. While in the computer mode, adapter 31 may also transmit messages from the transmit message queue, at the specified time as described above. Again, LED 93 indicates occurrence to the operator.

We claim:

1. A communication adapter for adapting a computer for operation as an intelligent telecommunication transceiver without modification of the hardware or software of the computer, the computer comprising a computer process unit, including a data store, connected to computer accessory units including a keyboard, a monitor, and a printer, the communication adapter comprising:
   computer port means, including a keyboard port, a monitor port, and a printer port, for connecting the adapter to the computer process unit;
   accessory port means, including a keyboard port, a monitor port, and a printer port, for connecting the adapter to the computer accessory units;
   a communication port for connecting the adapter to a telecommunication circuit;
   data storage means for storing data signals and actuation signals received through the accessory keyboard port, the communication port, and one of the computer printer and monitor ports;
   transmission logic means for supplying data signals from the data storage means to the communication port;
   accessory logic means for supplying data signals from the data storage means to the accessory printer and monitor ports;
   program storage means for storing operating programs for the communication adapter; and
   microprocessor control means operatively interconnected with all of the port means, both of the logic means, and both of the storage means, for controlling operation of the adapter in two basic modes:
   A. a computer mode in which data is interchanged freely between the accessory units and the computer process unit so that the computer process unit and the computer accessory units all function as if the adapter were not present, and
   B. a communication mode in which data is interchanged freely between the computer accessory units and the communication port so that the adapter and the computer accessory units function as if the computer process unit were not present;
   the data storage means and the logic means remaining active to receive and store signals from the communication port and to transmit pre-recorded signals from the data storage means through the communication port when the adapter is in its computer mode of operation; and
   the control means being responsive to signals from the keyboard, in both modes, for actuation of the adapter between its computer and communication modes of operation.

2. A communication adapter for a computer, according to claim 1, and further comprising:
   buffer storage means, connected to the accessory keyboard port, for storing all signals from the keyboard for a very brief interval not readily perceptible to a user, in both modes of operation.

3. A communication adapter for a computer, according to claim 2, in which the data storage means comprises a print-spooler for the accessory printer port in both modes of adapter operation.

4. A comunication adapter for a computer, according to claim 3, in which the data storage means records data signals in a plurality of separately identifiable directories including directions for local messages, transmitted messages, received messages, and transmit queue messages.

5. A communication adapter for a computer, according to claim 4, in which the program storage means includes an editing program for editing of messages recorded in the local messages directory.

6. A communication adapter for a computer, according to claim 5, in which the program storage means includes a plurality of recorded auto sequences for controlling operation of the adapter in its communication mode, and in which the editing program is effective for editing the auto sequences.

7. A communication adapter for a computer, according to claim 4, in which all messages in the local, transmitted, and received directories are identified in a first sequence and all messages in the transmit queue directory are identified in a second sequence, with both sequences determined by the program storage means.

8. A communication adapter for a computer, according to claim 1, in which the program storage means includes stored programs for transferring data from the computer process unit to the data storage means and from the data storage means to the computer process unit.

9. A communication adapter for a computer, according to claim 8, in which data stored in the data store of the computer process unit is transferred to the adapter data storage means by effective connection of the computer printer port to the data storage means in a transfer modification of the computer mode of operation.

10. A communication adapter for a computer, according to claim 9, in which the transfer modification of the computer mode of operation is initiated manually through the keyboard.

11. A communication adapter for a computer, according to claim 9, in which the transfer modification of the computer mode of operation is initiated by control signals recorded in a header to the message to be transferred.

12. A communication adapter for a computer, according to claim 2, in which the control means is responsive to a predetermined sequential combination of keyboard signals, when the adapter is in its computer mode, to effect a changeover to the communication mode.

13. A communication adapter for a computer, according to claim 12, in which said combination of keyboard signals is ALT and PRTSC.

14. A communication adapter for a computer, according to claim 12, in which a preselected sequential combination of keyboard signals effects a changeover from the communication mode to the computer mode.

15. A communication adapter for a computer, according to claim 14, in which the two combinations of keyboard signals are the same.

16. A communication adapter for a computer, according to claim 15, in which the data storage means comprises a print-spooler for the accessory printer port in both modes of adapter operation.

17. A communication adapter for a computer, according to claim 1, in which the data storage means comprises a print-spooler for the accessory printer port in both modes of adapter operation.

18. A communication adapter for a computer, according to claim 17, in which the program storage means includes an editing program for editing of messages recorded in a local messages directory.

19. A communication adapter for a computer, according to claim 18, in which the program storage means includes a plurality of recorded auto sequences for controlling operation of the adapter in its communication mode, and in which the editing program is effective for editing the auto sequences.

20. A communication adapter for a computer, according to claim 8, and further comprising:
buffer storage means, connected to the accessory keyboard port, for storing all signals from the keyboard for a very brief interval not readily perceptible to a user, in both modes of operation.

21. A communication adapter for a computer, according to claim 20, in which the data storage means comprises a print-spooler for the accessory printer port in both modes of adapter operation.

* * * * *